No. 755,932. PATENTED MAR. 29, 1904.
M. PRUYN.
CULTIVATOR.
APPLICATION FILED DEC. 18, 1903.
NO MODEL.
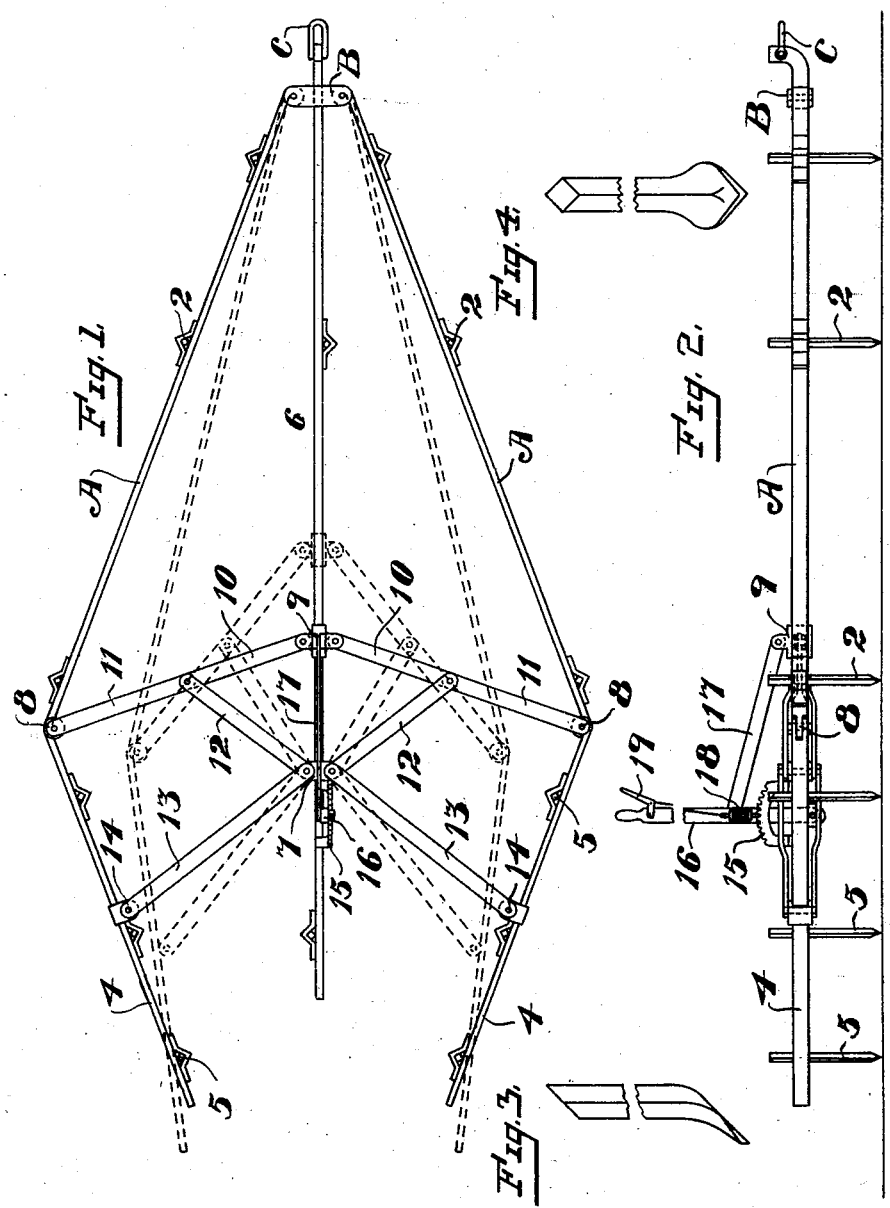

No. 755,932. Patented March 29, 1904.

UNITED STATES PATENT OFFICE.

MARCELLUS PRUYN, OF FLORIN, CALIFORNIA, ASSIGNOR OF ONE-HALF TO R. M. JONES, OF FLORIN, CALIFORNIA.

CULTIVATOR.

SPECIFICATION forming part of Letters Patent No. 755,932, dated March 29, 1904.

Application filed December 18, 1903. Serial No. 185,647. (No model.)

*To all whom it may concern:*

Be it known that I, MARCELLUS PRUYN, a citizen of the United States, residing at Florin, in the county of Sacramento and State of California, have invented new and useful Improvements in Cultivators, of which the following is a specification.

My invention relates to improvements in devices for cultivating the earth, and is especially applicable to that class of cultivators known as the "A-cultivator," having sides diverging from the front, where they are united, and provided with cultivating-teeth.

My improvement consists in the employment of reversed or convergent bars hinged to the rear of the divergent ones and means by which the rear ends of said bars are drawn toward or separated from each other.

My invention also comprises details of construction, which will be more fully explained by reference to the accompanying drawings, in which—

Figure 1 is a plan view of my invention, dotted lines showing adjustment. Fig. 2 is a side elevation of same. Fig. 3 is an enlarged side view of a cultivator-tooth. Fig. 4 is a front view of same.

In the operation of what are known as "A-cultivators" the fine earth passes between the teeth and toward the center and between the rows which are where the cultivator travels, the fine earth being thus drawn away from the plant-row, leaving the last tooth and an open furrow close to the plant-row, while the clods and coarse material will be thrown outward, passing around the ends of the cultivator, and they are left on or near the plant-row. My improvement is designed to reverse this operation by the use of the reversed or converged portions of the frame, and by leaving a space between the front teeth and those of the reverse-bar, through which the clods pass inwardly, where they clog the center of the rows, where they may be readily pulverized, while the fine earth is thrown outwardly, and the last or furrow row formed by the convergent ends of the rear portion of the cultivator will be approximately four teeth distant from the rows.

A A represent the front side bars of a cultivator hinged to a transverse bar B and divergent toward the rear.

C is a clevis. 2 2 are cultivator-teeth fixed to the front portion of this device, and spaces are left between these front teeth and the rear end of the divergent bars A, so that when the cultivator is drawn between the plant-rows the action of these front teeth will be to pulverize the earth and the clods, and coarse unpulverized material will after passing these front rows of teeth pass under the bars A and into the central portion.

To the rear ends of the bars A are pivoted the bars 4, and these bars converge toward the rear and are provided with cultivator-teeth, as shown at 5.

6 is a centrally-disposed bar extending rearwardly from the transverse bar B, to which the front ends of the bars A are hinged. 7 is a socket-piece fixed to this bar approximately in line between the hinges 8, which connect the bars A and 4, and 9 is a slide movable upon the central bar 6.

10 represents links having the inner ends pivoted to the slide and the outer ends connecting with links 11, the outer ends of which are pivoted to the joints.

The meeting ends of the links 10 and 11 are pivoted together, and bars 12 connect this joint with the block or socket-piece 7. Other bars 13 extend rearwardly from this block 7 and are pivoted to the bars 4, as shown at 14. These jointed connecting-bars serve to unite and adjust the outside bars A and 4, forming the cultivator, as follows:

15 is a segmentally-toothed rack fixed to the rear portion of the central bar 6, and 16 is a lever fulcrumed to move radially over this segmental arc. Pivoted to the lever 16 is an arm 17, which extends from the lever to the slide 9. The lever-arm carries a spring-pressed pawl, as at 18, operated by the usual connecting-rod and lever-arm 19, so that the pawl may be disengaged from the segmental rack and the lever-arm moved backward or forward. When this lever-arm is moved forward, the slide 9 will also be moved and the various connecting-links will be moved in unison, so that the sides A and 4 of the cultivator will be drawn nearer together, and the cultivator may be adjusted to pass beneath narrow rows or for other purposes The reverse movement of the lever moves the slide 9 toward the rear, and acting through the connecting-links 10, 11, and 12 the junction of the bars A and 4 will be separated and the cultivator made correspondingly wider.

The links 13 connecting the block 7 with the rear ends of the bars 4 maintain the rear ends of these bars in the proper position with relation to each other and prevent their being spread out in unison with the spreading of the jointed angles at 8. In this manner I am enabled to accurately adjust the cultivator to the character of work which is to be done, and the teeth of the rear ends of the bars 4, which form the final furrow, will be so far away from the plant-rows as not to leave the roots too much exposed, while the clods and coarse material being drawn in by the rows of teeth on these converging sides 4 will be left near the center between the rows, where they can be easily pulverized. The fine dirt passing outward between the teeth 5 of these convergent rows will in like manner be thrown outward close up to the plant-rows, thus fulfilling all the conditions for the best cultivation of the soil and for the good of the plants.

It will be manifest that any suitable or desired form of teeth may be employed in this apparatus which will best produce the results to be arrived at, as above described.

Having thus described my invention, what I claim, and desire to secure by Letters Patent, is—

1. The combination in a machine of the character described of tooth-carrying bars having the front ends contiguous to each other and divergent toward the rear, other tooth-carrying bars pivoted to the rear ends of the front bars, said second bars converging from the joint toward the rear, and means including a transverse link connection with the joint between the meeting ends of the front and rear bar whereby the meeting ends of the two sections may be separated or drawn toward each other.

2. The combination in a machine of the character described of tooth-carrying bars having the front ends pivoted contiguous to each other, and to a draft mechanism, said draft diverging toward the rear, other tooth-carrying bars hinged to the rear ends of the divergent bars and convergent from the hinge-joint to the rear transverse links approximately in the plane of the joint between the meeting ends of the front and rear bars and pivotally connected; and centrally-disposed slidable and stationary blocks connected with the links whereby the meeting ends of the two sets of bars may be separated or drawn toward each other, and the rear ends of the convergent bars maintained at a proper distance apart.

3. The combination in a machine of the character described of tooth-bars having the front ends pivoted contiguous to each other and to a draft mechanism, said bars diverging from their pivot-points toward the rear and having teeth near the front end only whereby clods and coarse material are allowed to pass into the central portion, other bars hinged to the rear ends of the divergent bars, said second bars converging from the hinges to the rear end and carrying teeth by which the pulverized earth is thrown outwardly toward the plant-rows and the clods are carried toward the center and mechanism disposed in substantially the transverse plane of the meeting ends of the front and rear bars and including links connecting with said meeting ends and stationary and slidable blocks whereby the width of the jointed frame may be increased or diminished.

4. The combination in a machine of the character described of tooth-carrying bars having the front ends hinged contiguous to each other and a draft mechanism divergent from the hinge-points rearwardly, other tooth-carrying bars hinged to the rear ends of the first-named bars and convergent from the hinges to the rear ends, a centrally-disposed bar extending from the front toward the rear, a segmentally-toothed rack fixed near the rear end of the central bar, a lever and pawl movable with relation to said rack, a slide movable upon the central bar and a rod connecting the lever with said slide, links pivoted to the slide and other links pivoted at the uniting joints of the toothed bars, and also to the first-named links, other links connecting the joints between the two sets of links above named with a stationary point upon the central bar and links connecting this stationary point with the rearmost tooth-bars whereby the junction of the front and rear tooth-bars may be expanded or contracted.

5. The combination in a machine of the character described, of tooth-carrying bars having the front ends hinged contiguous to each other and divergent rearwardly from said joint, other tooth-carrying bars hinged to and convergent rearwardly from the rear of said first-named bars, means including links disposed in substantially the transverse plane of the meeting ends of the front and rear bars for expanding or contracting the width of the cultivator, and connections whereby the rear tooth-bars are automatically adjusted in unison with said expansion or contraction.

In testimony whereof I have hereunto set my hand in presence of two subscribing witnesses.

MARCELLUS PRUYN.

Witnesses:
 E. OPPENHEIM,
 L. M. LANDSBOROUGH.